United States Patent Office 3,441,951
Patented Apr. 29, 1969

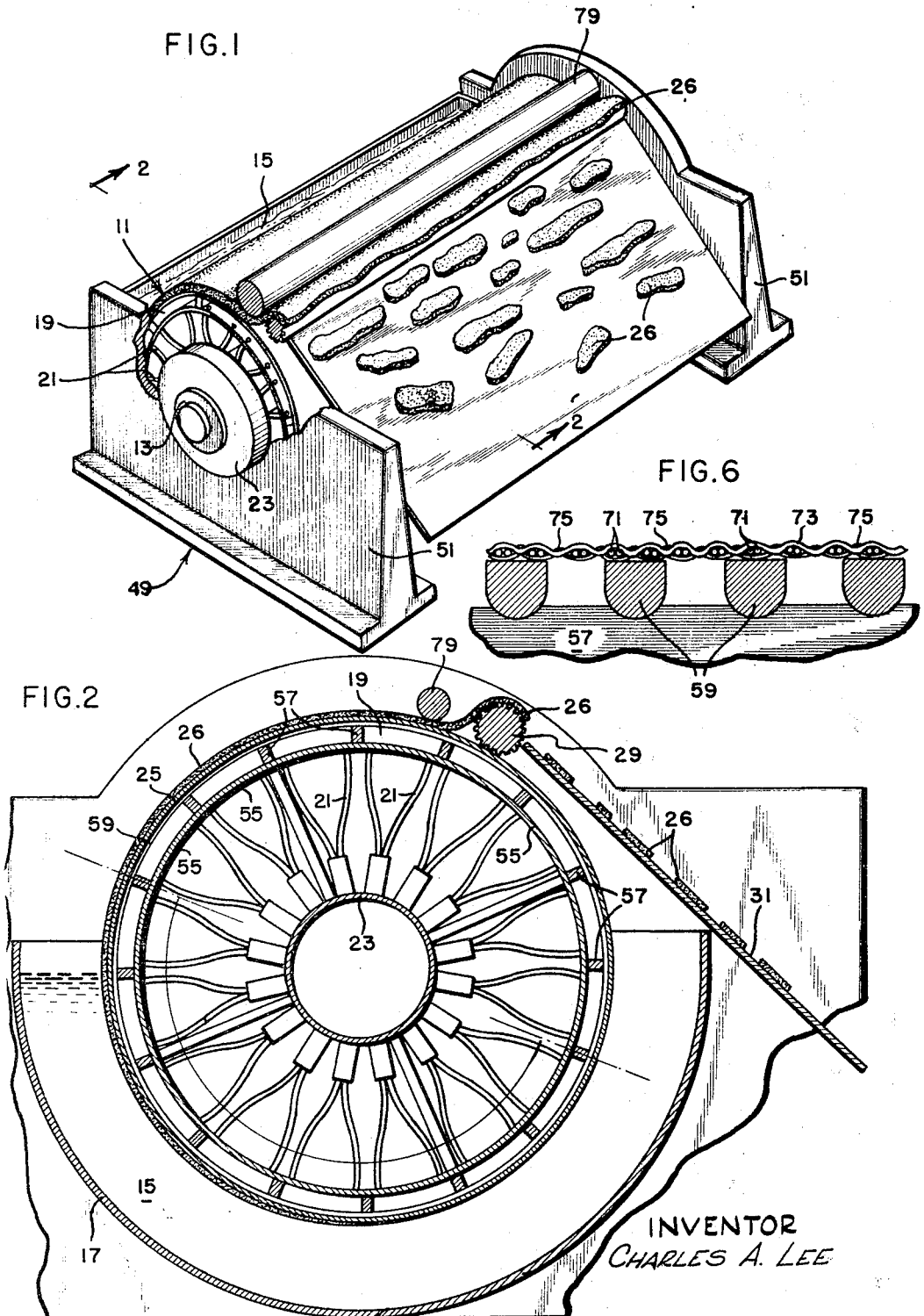

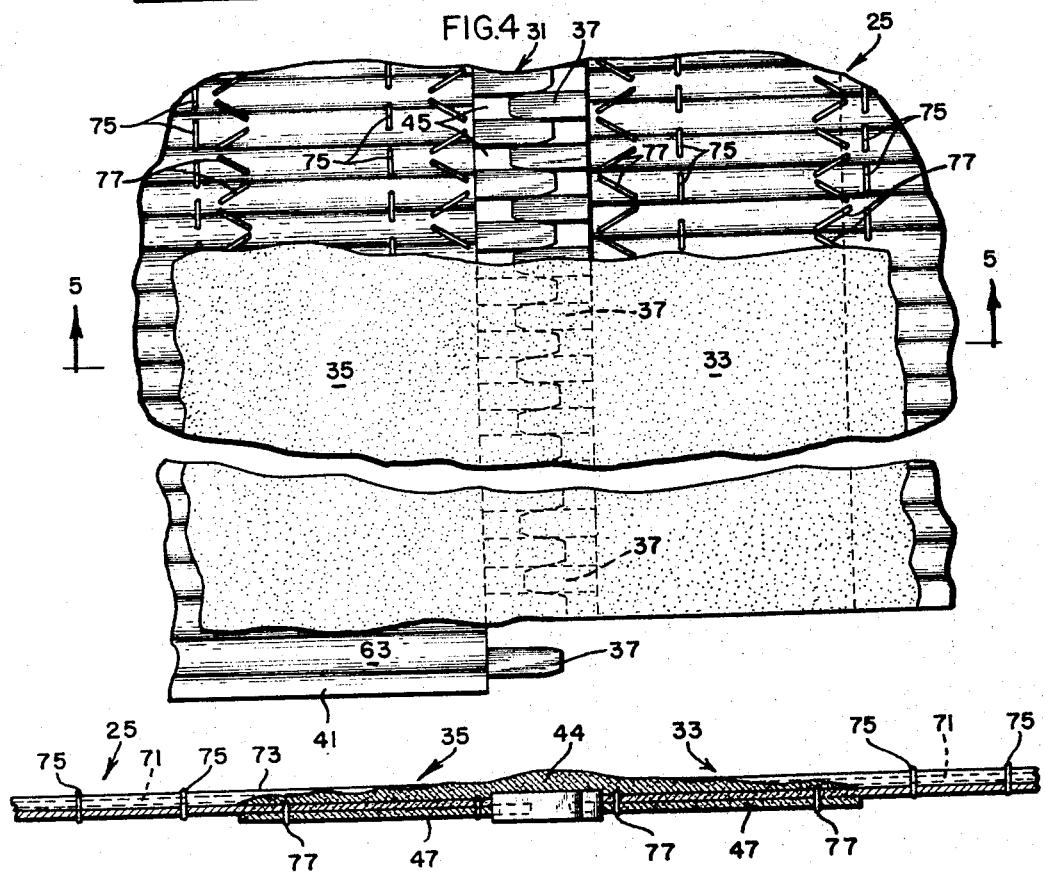

3,441,951
ZIPPERED BELT FOR A ROTARY FILTER
Charles A. Lee, Knoxville, Tenn., assignor, by mesne assignments, to Appleton Wire Works Corporation, Appleton, Wis., a corporation of Wisconsin
Filed Jan. 25, 1968, Ser. No. 700,483
Int. Cl. B01d 33/00
U.S. Cl. 24—31                                    10 Claims

ABSTRACT OF THE DISCLOSURE

A filter medium is provided in the form of a belt for attachment about the circumferential surface of a filter drum. Opposing ends of the filter medium are at a bias angle, usually less than 10° to the transverse dimension of the belt, and slide fastener sections are fastened to these belt ends. To adjust the belt length and thereby compensate for variations in drum or belt length, the ends of the belt are shifted laterally relative to one another when on the drum. A slide is then passed across the slide fastener sections to unite them at the adjusted length. A protective coating, such as an epoxy adhesive, may be applied to coat the slide fastener sections and fill any voids therein.

---

This invention relates to a filter medium and to a method of attaching the filter medium about the circumferential surface of a filter drum.

Typically, filters employing a drum have a filter medium in the form of an endless belt of meshed wire, cloth, woven fabric or other permeable material wrapped on the circumferential surface of the drum. Filtration is accomplished by forcing a suspension of solid material against the filter medium and collecting the solids on its surface while the filtrate passes through the filter medium. In the paper industry, a common form of drum filter for filtering papermill effluent employs a negative pressure (vacuum) within the drum to provide a pressure differential to force the liquid through the filter medium and thereby accelerate the straining out of the suspended solids on the outer surface of the filter medium. Usually, the drum is supported for rotation in a tank of liquor and is continuously rotated to bring each of successive areas of the filtering medium into the liquor.

Although some drums have a vacuum applied to their entire interior as one large compartment, the most common form of drum vacuum filter has its interior divided into a large number of compartments. Each compartment is connected by pipes to an automatic valve located at trunnions for the drum, and the valve selectively applies the vacuum to the compartments when their outer surfaces submerge. This draws the filtrate into the drum interior to be pumped away. The suspended solids are collected as a layer, usually called filter cake, on the outside of the filter medium. As the cake emerges from the tank liquid, the vacuum is usually maintained thereafter in order to draw air through the cake to dry it further. At a later point, as after the cake passes over the crest of the drum, the vacuum is automatically cut off, and the cake is separated from the drum. In some instances, a positive pressure is then applied to blow the cake off. In any event, the cake is removed by means such as a scraper blade, ribbed rolls or air jets. The cleaned surface turns through a short arc and resubmerges. The valve prevents reconnection with the vacuum source until the surface of a compartment is again below the liquid level.

These filter drums are usually quite large, for example, eight feet in diameter and sixteen feet in width. It is difficult to make the drums an exact size. Therefore, the drum diameter is a nominal dimension, and the actual circumference of the drum may vary from installation to installation in the field. It is also difficult to make a filter medium exactly the right length due to tolerance variations in measuring the drum and cutting the filter medium to size. Consequently, filter media could not practically, under the prior art practices, be made in advance to the nominal circumferential dimension of the drum. Not only do drum circumferences vary from installation to installation, but some drums operate with hot liquors, e.g., a ground wood liquor at 140°–150° F., which causes an expansion of the drum after the filter medium is fitted on the drum. If the belt is cut slightly short and is snug when placed on the cold drum, a subsequent submersion of the belt may shrink the belt fabric and result in undesirably high tension forces on the filter medium. On the other hand, the filter medium may not be left with such a loose fit on the drum that it is baggy or has a loose flap since this will result in a rapid wearing of the belt fabric by the cake scraper, or result in wrinkles and leaking of the vacuum from a compartment.

Heretofore, such prior art drum filter media were usually custom built belts. Each drum's circumference was carefully measured, and the belt was then cut to size. The belt was wrapped about the drum, and its opposite ends were joined by a hand sewn or hand woven seam. Because of the large width of the drum seam and the awkward position in which to sew, the hand sewing or weaving operation was laborious and time consuming. It was expensive not only from the standpoint of labor involved in making the seam in the field under adverse conditions, but also very expensive in view of considerable down time of the filter machine while the belt seam was being formed.

Accordingly, a general object of the invention is to provide a new and improved filter medium and a method of attaching the filter medium to a filter drum.

A further object of the invention is to provide a standard, off-the-shelf filter medium which can be quickly adjusted in the field to provide a proper fit for filter drums whose circumference may vary from the nominal circumference.

Other objects and advantages of the invention will become apparent from the detailed description taken in connection with the accompanying drawings in which:

FIGURE 1 is a perspective view of a filter apparatus utilizing the filter medium of the present invention;

FIGURE 2 is a sectional view of the apparatus shown in FIGURE 1 taken along the line 2—2 of FIGURE 1;

FIGURE 3 is a diagrammatic plan view of a filter medium disposed on a filter drum like that shown in FIGURE 1;

FIGURE 4 is an enlarged fragmentary view of the filter medium of FIGURE 3 showing interconnected zipper teeth for securing the filter medium on the drum in accordance with the method of the present invention;

FIGURE 5 is a cross sectional view of the zipper construction shown in FIGURE 4, taken along the line 5—5 of FIGURE 4; and FIGURE 6 is an enlarged fragmentary view of a wire for supporting the filtering medium of this invention.

As shown in the drawings for purposes of illustration, the invention, very generally, is suitable for use in connection with a conventional filter of the drum vacuum filter kind in which a rotatable, cylindrical drum 11 is journaled in trunnions 13 for rotation about a horizontal axis with a portion of its circumference submerged in a suspension 15 of particles in a tank 17. The outer portion of the drum is divided circumferentially into compartments 19 (FIGURE 2) each of which is connected by at least one line 21 to a multi-port valve 23 having a series of valve ports located at the trunnion for the drum. A vacuum line from a suitable vacuum pump (not shown) provides a negative pressure which is selectively applied by the valve through its ports and connecting lines 21 to the respective compartments 19. Those compartments 19 which are submerged receive the suction and draw the liquid through a filter medium 25 in the form of an endless belt or band on the outer circumference of the drum. This separates the solids from the liquid filtrate which now moves through the lines 21 and out of the valve 23. The solids form a cake 26 on the surface of the filter medium 25.

In some instances, the cake 26 formed by the solids on the filter medium is the valuable substance, and in other instances, it is the quality of the filtrate which is important, and the cake is thrown away. The solids begin to deposit when each compartment submerges and continue to deposit on each covered compartment until it emerges from the liquid. After rising above the liquid level, the cake is usually dewatered, i.e., further moisture is removed in the cake. To this end, a vacuum is applied through a valve port as the cake 26 is carried to the crest of the drum. The valve 23 then shuts off this port, and the cake 26 is carried to the discharge section at which means, such as a ribbed scraper roll 29, scrapes the cake 26 from the filter medium 25. The cake leaves the filter medium 25 and slides down an apron 31 to a conveyor or other collecting devices (not shown).

The present invention is directed to the method of attaching a filter medium to such a drum and to the filter medium, per se, and hence is not to be considered as limited to the illustrated filter which is only one of many kinds of filters employing a filter medium to separate solids from a liquid. As will be explained, the filter medium 25 should fit snugly, e.g., with a skin tight fit, to the surface of the drum when in operation. If the filter medium is too tight, it may be subjected to tensile forces which reduce its usable life due to breaking of the filaments of the filter medium when subjected to continued operation. On the other hand, if the filter medium is too loose, it may flap and cause wear by scraping against the discharge blade or wrinkle and crimp the filaments. Wrinkles in the filter medium are a source of leakage of liquor, which would make the filtrate turbid. Also, wrinkles may dissipate or break the vacuum in a compartment by allowing ambient air into the compartment during the dewatering portion of the filtering cycle.

Heretofore, filter media were cut to size to custom fit the drum circumference and then wrapped about the periphery of the drum with opposite ends of the belt brought into alignment. The belt ends were then hand sewn, stitched or woven together to form an endless band. This was an expensive and laborious task resulting in considerable filter down time. Further compounding the difficulties of providing a standard size of filter medium for a nominal size of drum is the fact some drums are submerged in hot liquids which caused the drum to expand and the fabric fibers to shrink, as for example, a drum immersed in a ground wood liquor of 140° to 150° F. For example, with the illustrated kind of filter having a nominal diameter of eight feet and a transverse or width dimension of sixteen feet, it has been found that the circumference of the drum may vary several inches from installation to installation and tolerances in measuring and cutting of the belt to the exact size also must be allowed for by additional material or some adjusting means.

According to the present invention, a filter medium 25 is provided which may be manipulated in a novel manner to adjust its size to assure a tight fit, in use, and to provide expeditious fastening of the belt ends by a fastening means, such as, mating sections of a zipper slide fastener 31 (FIGURE 5). More specifically, each end 33 and 35 of the belt is provided with mating sections in the form of a set of zipper teeth 37 for alignment and interconnection by a zipper slide (not shown). To adjust belt size to assure an in-use tight fit and to achieve the alignment of the zipper teeth sets, each set of teeth is fastened to a belt end at an angle (A) to the width or transverse direction of the belt. Because the zipper is set at an angle, sliding of the belt ends relative to one another transversely of the belt and generally parallel to the drum axis causes the zipper teeth on one end of the belt to move circumferentially toward or away from the other set of teeth. When the teeth are properly juxtaposed, a conventional zipper slide (not shown) can be started at one end of the belt and then run across the drum surface to the other side of the belt. Due to the lateral shifting of a belt end 33 or 35, one corner 39 (FIGURES 3 and 4) of the belt end 33 will be displaced inwardly or outwardly of the adjacent facing corner 41 on the other belt end 35. The projecting corner is preferably trimmed so that the belt has side edges 43 in planes substantially parallel to the planes defined by the ends of the drum. Also, as will be explained, the interlocked zipper teeth are then coated with a material 44, such as epoxy adhesive, which fills the open spaces 45 (FIGURE 4) about and between the zipper teeth against intrusion of particles tending to separate the teeth. The coating protects tapes or fabrics 47 (FIGURE 5), usually made of a nylon or cotton fabric, to which the teeth 37 are affixed and also protects the zipper teeth, which are usually made of brass, from the deleterious effects of the liquor.

The filter medium 25 may thus be initially made slightly oversize, e.g., about 1 to 1½% oversize, to assure that the medium can be slipped about the drum to bring the fastener teeth 37 together for attachment. By sliding the belt ends laterally, the amount of slack in the belt is adjusted to the point where it is certain that shrink of the belt and expansion of the drum will give the desired snug fit when the drum is in the hot liquid 15.

Proceeding now with a detailed description of the invention, the filter includes a frame 49 (FIGURE 1) with opposite vertically extending end walls 51. Between these walls 51 extends the liquid receiving tank 17 having a semicircular bottom wall spaced beneath the bottom of the drum 11. The liquor 15 which is, in this instance, a hot ground wood liquor having a solids content of ½ to 1 percent, enters the left side of the tank 17 (FIGURES 1 and 2) from a source not shown. The liquid level in the tank is usually maintained at a constant value, which is usually about ½ to ⅔ of the drum circumference. As the liquid is being drawn into the drum at relatively large rates, the liquid level at the far (right) side of the tank is somewhat below the liquid level at the near, inlet side of the tank.

The drum is mounted for rotation in the trunnions 13 and has an internal frame or spider (not shown) which provides a rigid support for the compartments 19. Each of the compartments includes a bottom plate 55 and side plates 57 in the form of ribs extending radially inwardly to the bottom plate 55. The compartments extend across the full width of the drum and have end plates (not shown) to enclose the outer ends of the compartment. Lines 21 for draining filtrate and exhausting air from the compartments extend from each of the compartments 19 to the valve 23 so that the vacuum may be selectively applied to a compartment and filtrate withdrawn from submerged compartments, all in a known manner.

To provide a support for the filter medium 25, a wire 59 (FIGURES 2 and 6) is helically wound about the circumferential outer edges of compartment ribs 57. This support wire is called a "D" wire in view of its cross sectional shape. The illustrated wire is about ¼ inch wide and ⅜ inch in depth. The lead of the helical winding is about ½ inch per revolution so that the drum surface is about 50% open prior to receiving the filter medium 25. Other filter medium supports may be used such as wide open metal screen, grid panels, or perforated plates to provide an open, yet rigid support for the filter medium. Suitable bands or belts (not shown) may encircle the filter medium and secure the same to the wire support in a conventional manner.

The illustrated filter drum of a nominal eight foot diameter has a theoritical circumference of 301.4 inches and is about 192 inches in width. For drums of this circumference, it has been empirically determined to be preferable to provide a standard size, off-the-shelf filter medium which is slightly larger than the drum, e.g., 196 inches in width and about 306.5 inches in length from the ends of one set of zipper teeth 37 along the belt to the ends of the other set of zipper teeth 37. Thus, the filter medium is made about five inches longer than the nominal circumference of the drum. With this much additional length, the filter medium is readily disposed about the drum and the ends thereof are fastened together. The subsequent heating of the medium in the hot liquor shrinks it to the desired snugness. As will be explained, the length of the belt may be varied as other parameters, such as the angle A, are varied or when empirical conditions define a different range of size variations for a given nominal drum size.

If the drum diameter varies slightly from nominal, the length of the filter medium is adjusted by sliding the belt ends 33 and 35 relative to each other in a first direction. Because the sets of zipper teeth are disposed at an angle to the transverse direction of the drum, the lateral sliding of these belt ends causes their respective sets of zipper teeth to move circumferentially toward each other to close the gap 61 (FIGURE 3) therebetween. When the sets of teeth 37 are sufficiently aligned, the slide is started at one corner, for example, the corner 39 and is run to the right across the length of the zipper teeth which become interlocked by the slide in the conventional manner. Of course, if the belt is too long, the ends of the belt may be shifted oppositely.

The preferred and illustrated inclination of the belt is at a bias angle of about 6° to the transverse direction of the belt although this angle has been varied in practice between 3° to 10° to the transverse direction. If greater circumferential displacement is desired for a given lateral shifting movement, this angle can be increased above 10°. Angles below 3° afford too little circumferentially directed displacement in most instances.

It will be appreciated that sliding of a belt end on the drum shifts the pointed corners 39 and 41 out of alignment leaving triangular shaped portions 63 (FIGURES 3 and 4) which overlap the sides of the drum. These are usually severed, i.e., trimmed, to provide relatively parallel side edges 43 for the belt. As stated previously, the belt is preferably made 4 to 6 inches wider than the drum so that there is sufficient material available to trim the portions 63 without uncovering the ends of a compartment. These peripheral belt edges overlapping the sides of the drum may be folded inwardly to overlie the drum and receive an encircling belt or strap.

A fairly snug fit is desired to prevent slipping of the filter medium 25 on the wire support which could allow the seam at the zipper 31 to become curved or cocked and thus form diagonally extending wrinkles. These wrinkles are potential sources of abnormal wear, or leakage of air into a compartment and/or unfiltered liquor into a compartment. With the present invention, proper tension of the belt is assured to prevent slipping particularly when the drum expands after being heated by the hot liquor. As will be explained, the preferred belt material does not shrink to any great extent at these temperatures and the expansion of the drum provides a good, skin-tight fit between the belt and drum thereby minimizing the chances of any slipping therebetween. The belt is particularly strong, as will be explained, to resist the tensile forces exerted thereon.

It will be recalled that to protect the zipper tapes 47, which are usually made from a cotton or nylon fabric, and the zipper teeth 37, which are usually brass, from being adversely affected by the liquor 15, the preferred method includes the step of coating the zipper teeth and tapes with a conventional epoxy material 44. Sufficient epoxy is applied to impregnate the tapes 47 and to blind the interstices 45 between and about the zipper teeth 37. Thus, solids may not penetrate the teeth and work therein to force the teeth open. Epoxy is preferred as it is chemically resistant to ground wood liquor, is easy to apply, and adheres readily to the tapes and the metal zipper teeth as well. Materials other than epoxy may be used to coat the zipper 31 and still fall within the invention.

In accordance with the invention, the preferred filter medium 25 has unusually good tensile strength and filtering properties as well as the novel fastening means at its opposite ends. Meeting such requirements is the illustrated belt which is formed of a plurality of parallel rack filaments 71 (FIGURES 5 and 6) disposed to constitute a flat sheet on which is placed a nonwoven filler 73 formed of smaller denier filler filaments. Extending transversely across the rack filaments are sewn filaments 75 which may be stitched discretely between successive rack filaments to fasten the filler to the rack filaments. The preferred filter medium weighs about ½ ounce per square foot.

In the preferred embodiment, the rack filaments are relatively heavy and strong as they receive most of the tensile forces and are in tension when the belt is snug on the drum. One suitable rack filament is a continuous 660 denier filament of polyester sold under the trademark Dacron. The sewn filaments 75 may be of the same material and may be of 440 denier. In this instance, a sewing machine may make a chain stitch by a sewing machine needle (not shown) penetrating between rack filaments without piercing them. The spacing between parallel filaments, either rack or sewn filaments, is quite large so that filtering action is mainly provided by the filler 73. The preferred filler is a mat of randomly disposed filaments of spunbonded polyester sold by E. I. du Pont de Nemours and Company of Wilmington, Del., under the trademark Reemay. This filler has a density usually in the range of 1.2 oz./yd.$^2$ to 6.8 oz./yd.$^2$ and Frazier air permeabilities of about 120 to 780 cfm./ft.$^2$ at ½ inch $H_2O$ pressure differential. The filler filaments are fine, usually 3 denier, and define tortuous passageways through which the liquid may readily flow while the solids are retained on the outer surface of the filler. Other fibrous mats of synthetic material, glass, mineral or metal may be employed in the belt and fall within the purview of the invention.

To secure the sets of zipper teeth 37 firmly to the ends of the filter belt and eliminate any raw ends or unraveling of the belt, a zipper tape 47 is placed under each belt end 33 and 35 and parallel rows of stitches 77 are sewn transversely across the tape and belt. Herein, the stitches 77 are sewn between the rack filaments.

It has been found that the filter medium has unusually good wearing qualities. It is normally separated by a ⅛ inch clearance or gap from the edge of the fluted discharge roll 29 journaled between end walls 51 in the frame 49, hence, the outermost filaments of the belt receive only an occasional or slight scraping from the roll 29. Prior to reaching the ribbed roll 29, the cake 26 travels beneath a smooth surfaced roll 79 which also extends between and is journaled in the opposite end walls 51 and is disposed closely adjacent the fluted roll 29 with the axes of the two rolls parallel to the axis of the drum 11. The smooth roll 79 is spaced several inches from the outer surface of the filter medium 25 so that the cake may flow readily beneath it to the ribbed roll 29 which carries the cake 26 up through the space between these rolls. The rolls are spaced apart by about several inches at their peripheries. The hinged stock slide 31 extends angularly downwardly from the rear of the ribbed roll 29 and the discharging cake 26 slides down it to a conveyor or receiving container (not shown).

As an aid to understanding the invention, a brief description of the applying of a new filter medium 25 to the outer surface of a filter drum 11 will now be described. The filter medium 25 is provided in the form of a belt with a set of zipper teeth 37 at opposite ends 33 and 35 of the belt. The respective sets of zipper teeth are each disposed parallel to one another and at an angle to the transverse direction of the belt. The usual angle is about 6°, although the angle may vary and is usually within the range of about 3° to 10° to the transverse direction of the belt. The adjustment in the circumferential direction and the making of the filter medium slightly larger than the nominal drum circumference allows compensation for fabric shrinkage and variations in measuring and cutting the belt in the actual drum circumference from the nominal circumference. In the illustrated embodiment of the invention, a nominal eight foot diameter drum having a nominal circumference of 301.4 inches is in most instances covered by a belt having a standard length of 306.5 inches.

The belt 11 is wrapped about the circumference of the drum while the drum is cold and the respective ends 33 and 35 of the belt are brought together, or as close thereto as possible, with their respective corners 39 and 41 aligned. If a relatively narrow gap 61 exists between the fastener teeth, each of the respective belt ends 39 and 41 is slid transversely and in opposite directions along lines parallel to the drum axis. This results in shifting the zipper teeth circumferentially towards one another to close the gap. When the zipper teeth are disposed adjacent to one another, a zipper slide is started at one end of the belt and is run across the sets of teeth to interlock them in the conventional manner to form the seam for the belt.

In the preferred form of the invention, the belt is made substantially wider than the drum width, thereby providing an overlapping edge at each end of the drum. The triangular corner sections 63 formed by the lateral shifting are then trimmed to provide the relatively parallel sides 43 for the belt which then are folded to remove the overlap over the edges of the drum. The belt is relatively snug on the drum after the drum expands, as when it is used with a hot liquor.

If, in the above example, the drum circumference is less than 306.5 inches, the sets of zipper teeth 37 will overlap. In this instance, one of the belt ends 39 or 41 may be shifted transversely to cause a circumferential movement of the belt teeth. With the sets of teeth aligned, a slide is started and run across the teeth to fasten the same together. The belt need not be completely snug when zippered, when the drum is used in a hot liquid, as the expansion of the drum and shrinking of the fabric is sufficient to make the belt tight. The corner sections 63 are trimmed to provide the parallel edges 43 for the belt.

It will be appreciated that the method of attaching the filter medium about the drum can be applied to various drums other than that shown and described. Furthermore, filter drums of the illustrated kind come in various nominal diameters, and the eight foot diameter drum is to be considered only as a convenient example by which to describe the present invention. The standard size of the zipper belt is determined empirically and will vary considerably with the size of the drum and other parameters. While an angle between 3° to 10° has been found to be most advantageous in the illustrated embodiment of the invention, it will be appreciated that the angle can be varied from this range when a greater or less circumferential adjustment is desired.

From the foregoing it will be seen that the present invention provides a unique filter medium and a method of attaching it to a filter drum to obtain a relatively snug fit on drums which may vary slightly from a nominal circumference for the drum. Considerable economies are derived from the elimination of custom fitting by cutting each belt to size and the tedious and laborious task of providing a hand stitched or woven belt seam. The use of an ordinary common zipper provides a low cost mechanical fastener, and the coating of the zipper with a protective material such as an epoxy allows the use of what otherwise would normally be thought of as too hostile an environment in which to use a zipper fastener. The present invention is not limited to the use of a fastening means of only a zipper type, but encompasses the use of other kinds of fastening means, such as slide fasteners having locking elements other than zipper teeth.

While a preferred embodiment has been shown and described, it will be understood that there is no intent to limit the invention by such disclosure but, rather, it is intended to cover all modifications and alternate constructions falling within the spirit and scope of the invention.

What is claimed is:

1. The method of fastening a flexible filter medium about the circumferential surface of a cylindrical filter drum comprising the steps of: providing mating fastener sections for a slide fastener on respective opposite ends of said filter medium at an angle to the transverse direction of the filter medium, wrapping said filter medium about said circumferential surface to bring said ends of said medium adjacent one another, sliding at least one of said ends of said filter medium transversely across the drum surface whereby said mating sections are moved circumferentially relative to one another, moving a slide along the fastener sections and across the drum to fasten together said slide fastener, and coating said mating sections with a protective material to protect it during a filtering operation.

2. A method in accordance with claim 1 in which sliding of said filter medium ends relative to one another results in offset corners for the filter medium on at least one side of the drum and further including the step of trimming said corners to provide an even side edge for the medium.

3. A method in accordance with claim 1 in which said slide fastener sections include a set of zipper teeth on a fabric fastened to said filter medium and in which said protective material is an epoxy and impregnates the zipper carrying fabric and binds the spaces between and about the zipper teeth.

4. A method in accordance with claim 1 in which said angle is less than 10°.

5. A method of fastening a flexible filter medium about the circumferential surface of a cylindrical filter drum comprising the steps of: providing fastening means on opposite ends of said filter medium at an angle of less than 10° to the transverse dimension of the filter medium, wrapping said filter medium about said circumferential surface to bring said ends adjacent to one another, sliding at least one end of said filter medium transversely across the drum surface whereby at least one of said fastener means is moved circumferentially for alignment and connection with the other, and connecting said fastening means to one another to form said filter medium into an endless belt about the circumference of said drum so that the filter medium has a snug fit on said drum when the latter is in operation.

6. The method of claim 5 in which said fastening means are each attached by a fabric to said filter medium and including the further step of coating said fastening means and said fabric with protective material to protect them against adverse environmental effects during a filtering operation.

7. A filter medium for attachment to a filter drum comprising a permeable belt terminating at opposing ends along respective straight edges disposed at the same bias angle relative to the transverse direction of the belt, a first section of a slide fastener secured to one of said ends along the respective one of said edges, and a second section of a slide fastener secured to the other of said ends along the respective one of said edges, said second section mating with said first section whereby when said belt is being applied to said drum, said ends may be shifted laterally relative to one another to adjust the length of the belt, and slide means for uniting said mating sections at the adjusted length of said belt.

8. The filter medium of claim 7 in which the first and second slide fastener sections each include a set of zipper teeth carried on a woven fabric, and in which said woven fabric is sewn to said belt.

9. The filter medium of claim 8 in which the zipper teeth are interlocked and a protective coating coats the fabric and fills the space between and about said zipper teeth.

10. A filter medium for attachment to a filter drum comprising a permeable belt having a plurality of parallel rack filaments disposed in a sheet, nonwoven filler formed of filler filaments disposed adjacent said rack elements on one face of said sheet, and sewn filaments stitched in rows over said filler filaments and rack filaments transversely of said rack filaments to form said belt; and fabric strips, each having a set of zipper teeth, fastened to respective ends of said belt and extending across said end at an angle to the transverse direction of said belt whereby when said filter medium is being applied to said drum, said zipper carrying ends may be shifted relative to one another across the drum to shift said teeth circumferentially.

References Cited

UNITED STATES PATENTS

| 1,852,732 | 4/1932 | Bong | 24—31 |
| 1,948,411 | 2/1934 | Asten | 24—33 |
| 2,805,773 | 9/1957 | Mecklin et al. | 210—107 XR |
| 2,893,007 | 7/1959 | Windt | 24—33 XR |

FOREIGN PATENTS 25,677    1910   Great Britain.

DONALD A. GRIFFIN, *Primary Examiner.*

U.S. Cl. X.R.

210—400